E. B. MANNING.
COFFEE-POT.
No. 183,464. Patented Oct. 17, 1876.
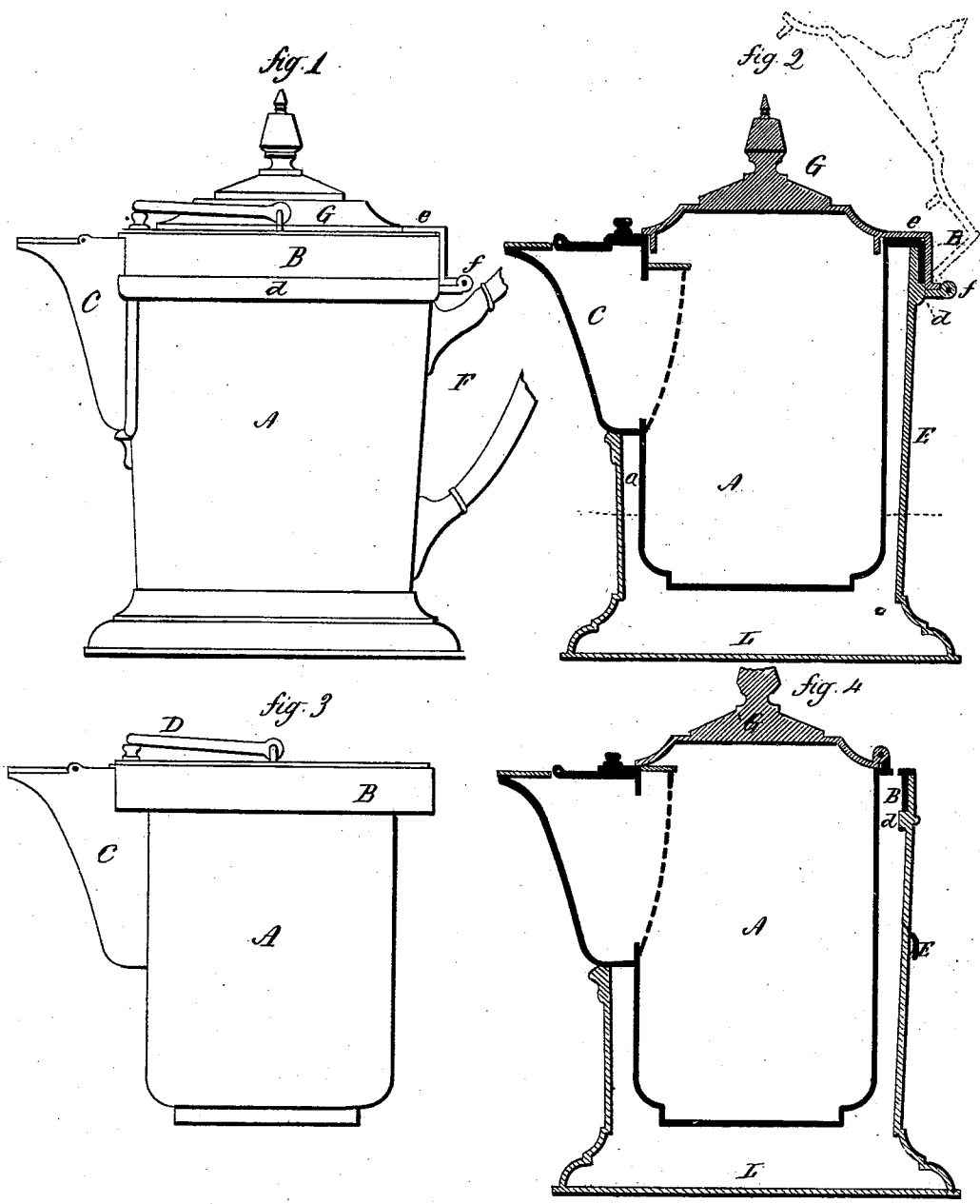

UNITED STATES PATENT OFFICE.

EDWARD B. MANNING, OF NEW HAVEN, CONNECTICUT.

IMPROVEMENT IN COFFEE-POTS.

Specification forming part of Letters Patent No. 183,464, dated October 17, 1876; application filed June 22, 1876.

*To all whom it may concern:*

Be it known that I, EDWARD B. MANNING, of New Haven, in the county of New Haven and State of Connecticut, have invented a new Improvement in Coffee-Pots; and I do hereby declare the following, when taken in connection with the accompanying drawings, and the letters of reference marked thereon, to be a full, clear, and exact description of the same, and which said drawings constitute part of this specification, and represent, in—

Figure 1, a side view; Fig. 2, a vertical central section; Fig. 3, a side view of the inner portion removed; and in Fig. 4, a vertical section of a modification.

This invention relates to an improvement in that class of tea and coffee pots known as "double-walled"—that is to say, an inner vessel surrounded by an outer casing, and so that the inner vessel may be removed therefrom, and when set within the outer case a tasteful table-vessel is produced; and the invention consists in the improvement hereinafter described and recited in the claims.

The inner vessel A (denoted in solid black, Fig. 2, and as seen in Fig. 3) may be of any desirable form, and with an overhanging vertical flange, B. It is constructed with a spout, C, and provided with a suitable bail or lifting device, D. The outer casing E is formed of a larger internal diameter than the inner vessel, and so as to leave a space between the two when set together. This outer vessel is constructed with a notch in its side, corresponding to the spout C, and with an annular bead, *d*, onto which the flange B will set, as indicated in Figs. 1 and 2. The vessel is also provided with a handle, F, in the usual manner for such articles. G, the cover, is of sufficient size to cover the inner vessel, as indicated in Fig. 2. From this a strap, *e*, extends to the rear, and thence down the outside of the vessel, where it is hinged, as at *f*, to the bead *d*, or other convenient point, so as to allow the vessel to be introduced when the cover is open, as indicated in broken lines, Fig. 2, and to cover the inner vessel, the strap *e* resting upon the top of the inner vessel, so as to hold it in place and prevent its shifting its position when the pot is tilted.

The flange B may be inside of the outer portion, as indicated in Fig. 4, and rest upon the inner bead or stop *d*, instead of outside, as before described.

In that case the hinge *f* may be raised to a position nearer the upper edge of the outer portion than shown in Fig. 2, that low position being necessitated by the outer flange B.

The cover G may be hinged directly to the inner vessel, as indicated in Fig. 4; but in that case the protection given by the hinge is lost.

The outer vessel is constructed with a close bottom, L, so that a considerable space is formed between the inner and outer portions. The inner vessel is removed, and water is poured into the outer vessel, sufficient, say, to fill it to the point indicated by broken lines, Fig. 2, when the inner vessel is in place. The tea or coffee, prepared for steeping, is placed in the inner vessel, and the inner vessel replaced; then both are set on the stove, or other heating device, and the steeping is produced by the medium of the water in the chamber around the inner vessel.

Suitable apertures should be made in the outer vessel for the escape of steam, as indicated in Fig. 4, and when the steeping has been properly accomplished the inner vessel is removed and the water poured from the outer, then the inner vessel is replaced, the outer wall or jacket serving to prevent the cooling of the contents of the inner vessel.

I am aware that it is not new to construct a double-walled vessel with the inner portion removable therefrom; hence I do not claim such construction; but What I do claim is—

1. The combination of the inner and outer vessel, the said inner vessel constructed with an overhanging or downward-projecting flange, and the said outer vessel provided with a bead or stop below the upper edge, on which the said flange rests to support the said inner vessel, all substantially as described.

2. In a double-walled vessel, the inner portion of which is constructed with a pouring-spout, and made removable, the combination therewith of the cover for the said inner vessel, extended outward over the edge of the inner vessel, and hinged to the outside portion, substantially as described.

EDWARD B. MANNING.

Witnesses:
JOHN E. EARLE,
CLARA BROUGHTON.